(12) United States Patent
Mitsui (10) Patent No.: US 9,726,926 B2
(45) Date of Patent: *Aug. 8, 2017

(54) DISPLAY DEVICE HAVING AN ANISOTROPIC SCATTERING MEMBER

(71) Applicant: Japan Display Inc., Tokyo (JP)

(72) Inventor: Masashi Mitsui, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,205

(22) Filed: Nov. 16, 2016

(65) Prior Publication Data

US 2017/0059921 A1    Mar. 2, 2017

Related U.S. Application Data

(63) Continuation of application No. 15/134,679, filed on Apr. 21, 2016, now Pat. No. 9,529,223, which is a (Continued)

(30) Foreign Application Priority Data

Mar. 6, 2012  (JP) ................................ 2012-049152

(51) Int. Cl.
G02F 1/1335 (2006.01)
G02B 5/02 (2006.01)

(52) U.S. Cl.
CPC ..... *G02F 1/133504* (2013.01); *G02B 5/0236* (2013.01); *G02B 5/0257* (2013.01); (Continued)

(58) Field of Classification Search
CPC .............................................. G02F 1/133504
See application file for complete search history.

(56) References Cited

U.S. PATENT DOCUMENTS

| 5,767,935 A | 6/1998 | Ueda et al. |
|---|---|---|
| 7,773,174 B2 | 8/2010 | Shimodaira |

(Continued)

FOREIGN PATENT DOCUMENTS

| CN | 103293752 | 9/2013 |
|---|---|---|
| JP | 2000-297110 | 10/2000 |

(Continued)

OTHER PUBLICATIONS

Chinese Office Action issued Jul. 27, 2016 in corresponding Chinese Application No. 2013100395088.

(Continued)

*Primary Examiner* — Timothy L Rude
(74) *Attorney, Agent, or Firm* — K&L Gates LLP (57) ABSTRACT

Disclosed herein is a display device including a reflection type image display portion having a sheet-like anisotropic scattering member. In an area, in an in-plane direction, of the anisotropic scattering member, a low-refractive index area and a high-refractive index area are disposed in a mixture style. The anisotropic scattering member is disposed so that a light is scattered when an outside light is made incident from a surface side on which a degree of a change in a refractive index in a vicinity of a boundary between the low-refractive index area and the high-refractive index area is relatively large, and is emitted from a surface side on which the degree of the change in the refractive index in the vicinity of the boundary between the low-refractive index area and the high-refractive index area is relatively small.

8 Claims, 10 Drawing Sheets

Related U.S. Application Data continuation of application No. 14/638,485, filed on Mar. 4, 2015, now Pat. No. 9,341,879, which is a continuation of application No. 13/741,943, filed on Jan. 15, 2013, now Pat. No. 9,025,114.

(52) U.S. Cl.
CPC ......... *G02B 5/0289* (2013.01); *G02B 5/0294* (2013.01); *G02F 1/133553* (2013.01); *G02B 2207/123* (2013.01)

(56) References Cited

U.S. PATENT DOCUMENTS

| | | | |
|---|---|---|---|
| 9,025,234 B2 | 5/2015 | Lin | |
| 2002/0047965 A1 | 4/2002 | Suzuki et al. | |
| 2013/0229603 A1 | 9/2013 | Tamaki et al. | |
| 2013/0235312 A1 | 9/2013 | Mitsui | |
| 2014/0198287 A1* | 7/2014 | Tamaki | G02F 1/133504 349/112 |
| 2014/0204296 A1* | 7/2014 | Mitsui | G02F 1/133504 349/33 |
| 2015/0160507 A1 | 6/2015 | Katsuta et al. | |
| 2016/0195773 A1* | 7/2016 | Lee | G02F 1/133617 349/71 |
| 2016/0195774 A1* | 7/2016 | Lee | G02F 1/133617 349/43 |
| 2016/0202541 A1* | 7/2016 | Asaoka | G02B 5/0226 359/599 |

FOREIGN PATENT DOCUMENTS

| | | |
|---|---|---|
| JP | 2008-239757 | 10/2008 |
| JP | 2012-141591 | 7/2012 |

OTHER PUBLICATIONS

Office Action issued in Japanese patent application No. 2015-201946, Jun. 21, 2016, 7 pages.

* cited by examiner

DISPLAY DEVICE HAVING AN ANISOTROPIC SCATTERING MEMBER

CROSS REFERENCES TO RELATED APPLICATIONS

The present application is a continuation of U.S. patent application Ser. No. 15/134,679, filed Apr. 21, 2016, which application is a continuation application of U.S. patent application Ser. No. 14/638,485, filed Mar. 4, 2015, issued as U.S. Pat. No. 9,341,879, on May 17, 2016, which application is a continuation application of U.S. patent application Ser. No. 13/741,943 filed Jan. 15, 2013, issued as U.S. Pat. No. 9,025,114, on May 5, 2015, which application claims priority to Japanese Priority Patent Application JP 2012-049152 filed in the Japan Patent Office on Mar. 6, 2012, the entire content of which is hereby incorporated by reference.

BACKGROUND

The present disclosure relates to a display device. More particularly, the present disclosure relates to a display device including an image display portion using a sheet-like anisotropic scattering member.

A reflection type image display portion is known which displays thereon an image by controlling a reflectivity of an outside light. For example, a reflection type liquid crystal display panel includes a reflective electrode which reflects an outside light. Thus, the reflection type liquid crystal display panel displays thereon an image by controlling the reflectivity of the outside light through a liquid crystal material layer. Since a display device including the reflection type image display portion displays thereon an image by utilizing the outside light, it is possible to attain the low power consumption, the thinning, and the weight saving. For this reason, the display device including the reflection type image display portion, for example, is utilized for a mobile terminal.

In the display device including the reflection type image display portion, scattering characteristics of the light in a display area of the image display portion are given an angle dependency, whereby a reflectivity for a predetermined observation position is increased, thereby making it possible to compensate for visibility reduction due to reflectivity reduction following the color displaying. In addition, an image can be prevented from being observed from a place out of the predetermined observation position. An anisotropic scattering member, which is used for view angle control or the like for the display device, and in which areas different in refractive index from one another are disposed in a mixture style, for example, is described in Japanese Patent Laid-Open Nos. 2000-297110 and 2008-239757.

SUMMARY

However, in the display device using the anisotropic scattering member having the structure described above, due to the interference of the lights owing to the fine structure of the anisotropic scattering member, the rainbow-coloring or the like is generated to impair the visual quality in some cases.

The present disclosure has been made in order to solve the problem described above, and it is therefore desirable to provide a display device in which rainbow-coloring due to a structure of an anisotropic scattering member can be reduced.

According to an embodiment of the present disclosure, there is provided a display device including a reflection type image display portion having a sheet-like anisotropic scattering member. In an area, in an in-plane direction, of the anisotropic scattering member, a low-refractive index area and a high-refractive index area are disposed in a mixture style. The anisotropic scattering member is disposed in such a way that a light is scattered when an outside light is made incident from a surface side on which a degree of a change in a refractive index in a vicinity of a boundary between the low-refractive index area and the high-refractive index area is relatively large, and is emitted from a surface side on which the degree of the change in the refractive index in the vicinity of the boundary between the low-refractive index area and the high-refractive index area is relatively small.

According to the embodiments of the present disclosure, the anisotropic scattering member is disposed in such a way that the light is scattered when the light is made incident from the surface side on which the degree of the change in the refractive index in the vicinity of the boundary between the low-refractive index area and the high-refractive index area is relatively large, and is emitted from the surface side on which the degree of the change in the refractive index in the vicinity of the boundary between the low-refractive index area and the high-refractive index area is relatively small. As a result, it is possible to lighten the rainbow-coloring due to the interference of the lights owing to the fine structure of the anisotropic scattering member.

Additional features and advantages are described herein, and will be apparent from the following Detailed Description and the figures.

DETAILED DESCRIPTION

Embodiments of the present disclosure will be described in detail hereinafter with reference to the accompanying drawings. The present disclosure is by no means limited to the embodiments, and various kinds of numerical values and materials in the embodiments are merely exemplified. In the following description, the same constituent elements or constituent elements having the same functions are designated by the same reference numerals or symbols, and a repeated description thereof is omitted for the sake of simplicity. It is noted that the description will be given below in accordance with the following order.

1. Description of Display Device and the Whole thereof of the Present Disclosure
2. First Embodiment
3. Second Embodiment
4. Third Embodiment
5. Fourth Embodiment 1. Description of Display Device and the Whole thereof of the Present Disclosure In a display device according to the embodiments of the present disclosure, it is possible to adopt a structure in which an anisotropic scattering member is disposed in such a way that a light is scattered when an outside light reflected within an image display portion is transmitted through the anisotropic scattering member. Or, it is also possible to adopt a structure in which the anisotropic scattering member is disposed in such a way that a light is scattered when an outside light made incident from the outside is transmitted through the anisotropic scattering member.

The anisotropic scattering member can include a composition containing therein a photoreactive compound or the like. For example, a light such as an ultraviolet light is radiated from a predetermined direction to a base material having a composition exhibiting a certain amount of refractive index change before and after photopolymerization, thereby making it possible to obtain the anisotropic scattering member. As far as a material composing the composition, it is only necessary that a material in which a certain amount of refractive index change is generated between a portion photoreacted and a portion not photoreacted is suitably selected from known photoreactive materials such as polymer having a radical-polymerizable or cationic-polymerizable functional group to use the photoreactive material thus selected.

Or, for example, a light such as an ultraviolet light is radiated from a predetermined direction to a base material having a composition in which a photoreactive compound and a non-photoreactive high-molecular compound are mixed with each other, thereby making it possible to obtain the anisotropic scattering member. It is only necessary that the non-photoreactive high-molecular compound, for example, is suitably selected from known materials such as an acrylic resin and a styrene resin to use the material thus selected.

A composition, for example, is applied onto a film-like base material having a high-molecular material by utilizing a known application method or the like, thereby making it possible to obtain the base material having the composition described above.

In an area, in an in-plane direction, of the anisotropic scattering member having the composition or the like described above, a low-refractive index area and a high-refractive index area are disposed in a mixture style. A boundary between the low-refractive index area and the high-refractive index area make a predetermined angle with a thickness direction of the anisotropic scattering member. This predetermined angle may continuously change in the in-plane direction as the case may be.

Qualitatively, when the light is radiated to the base material having the composition, the photoreaction of the composition proceeds in a portion of the base material closer to the light radiation side. Therefore, in a surface to which the light is radiated, the degree of the change in the refractive index in the vicinity of the boundary between the low-refractive index area and the high-refractive index area becomes relatively large. In a surface opposite to that surface, the degree of the change in the refractive index in the vicinity of the boundary between the low-refractive index area and the high-refractive index area becomes relatively small.

A difference in refractive index between the low-refractive index area and the high-refractive index area is normally preferably 0.01 or more in the vicinity of the surface in which the degree of the change in the refractive index in the vicinity of the boundary between the low-refractive index area and the high-refractive index area is relatively large, more preferably 0.05 or more, and is further more preferably 0.10 or more.

Figure 2A:
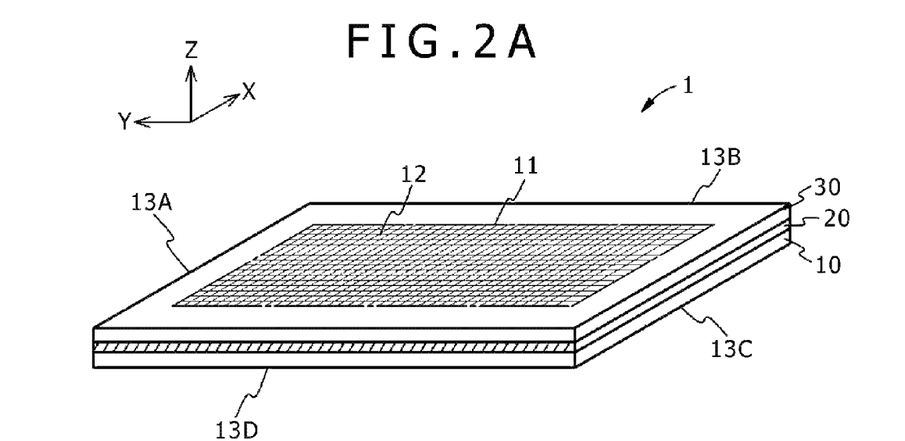
FIGS. 2A, 2B, 2C, and 2D are respectively a schematic perspective view explaining a construction of a reflection type image display portion according to the first embodiment, a schematic cross sectional view explaining a structure of an anisotropic scattering member according to the first embodiment, and schematic perspective views each explaining a disposition of a low-refractive index area and a high-refractive index area in the anisotropic scattering member.
Figure 2B:
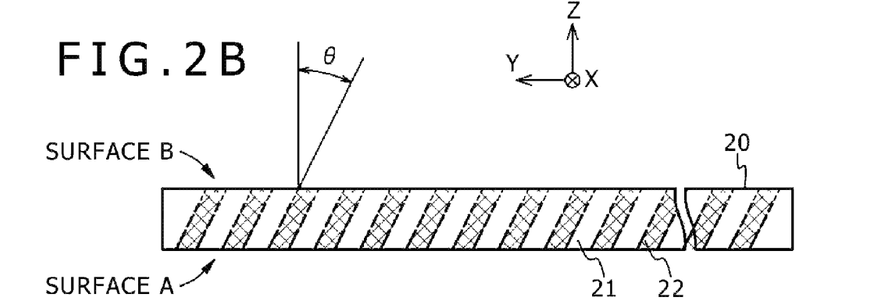
Figure 2C:
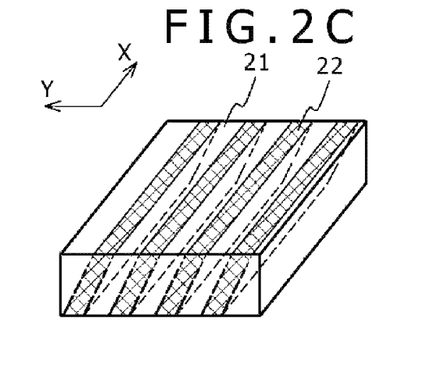
Figure 2D:
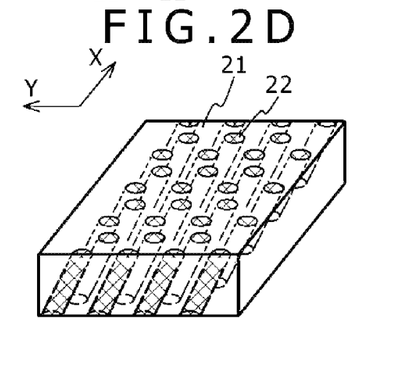

Although depending on the material composing the anisotropic scattering member and on a method of manufacturing the anisotropic scattering member, the portion photoreacted and the portion not photoreacted, for example, may form louver-like areas, respectively, as shown in FIG. 2C which will be described later. Or, the portion photoreacted and the portion not photoreacted may form a columnar area and a peripheral area surrounding the columnar area as shown in FIG. 2D which will be described later.

A reflection type image display portion composing the display device according to the embodiments of the present disclosure, for example, can include a reflection type liquid crystal display panel. The image display portion may be adapted either to monochrome display or to color display. The reflection type liquid crystal display panel includes a reflective electrode which reflects the outside light, and displays thereon an image by controlling reflectivity of the outside light by a liquid crystal material layer.

The reflection type liquid crystal display panel, for example, includes a front substrate including a transparent common electrode, a back substrate including a pixel electrode, the liquid crystal material layer disposed between the front substrate and the back substrate, and the like. The pixel electrode itself may be structured as a reflective electrode so as to reflect a light. Or, a reflective film may reflect a light by a combination of the transparent pixel electrode and the reflective film. An operation mode of the liquid crystal display panel is not especially limited as long as a reflection type display operation is left untouched. For example, it is possible to use a liquid crystal display panel which is driven in a so-called Vertical Alignment (VA) mode or Electronic CodeBook (ECB) mode.

In the display device of the embodiments of the present disclosure including the various kinds of preferable structures described above, the image display portion may have the reflection type liquid crystal display panel including the front substrate, the back substrate, and the liquid crystal material layer disposed between the front substrate and the back substrate. The anisotropic scattering member may be disposed on the front substrate side.

In the display device of the embodiments of the present disclosure including the various kinds of preferable structures described above, the anisotropic scattering member may have plural scattering members different in scattering characteristics from one another laminated one upon another.

A semi-transmission type liquid crystal display panel which, for example, has both of a reflection type display area and a transmission type display area within a pixel is known as a semi-transmission type image display portion having both of reflection type characteristics and transmission type characteristics. Such a semi-transmission type image display portion may also be adopted as the case may be. That is to say, "the semi-transmission type image display portion" is also included in "the reflection type image display portion."

A shape of the image display portion is not especially limited, and thus may be either a horizontally long rectangular shape or a vertically long rectangular shape. When the number (M×N) of pixels in the image display portion is represented as (M, N), for example, in the case of the horizontally long rectangular shape, several resolutions for the image display such as (640, 480), (800, 600), and (1024, 768) can be exemplified as a value of (M, N). In the case of the vertically long rectangular shape, the resolutions in which the values in the case of the horizontally long rectangular shape are replaced with each other with respect to M and N can be exemplified. However, the present disclosure is by no means limited to these values.

A driving circuit adapted to drive the pixel display portion can include various kinds of circuits. Well-known circuit elements or the like may be used for the various kinds of circuits.

The various kinds of conditions shown in this specification are fulfilled in a case as well where they substantially hold in addition to a case where they strictly hold. The presence of various kinds of dispersions generated in the design or in the manufacture is allowed.

2. First Embodiment

A first embodiment relates to the display device according to the present disclosure.

Figure 1:
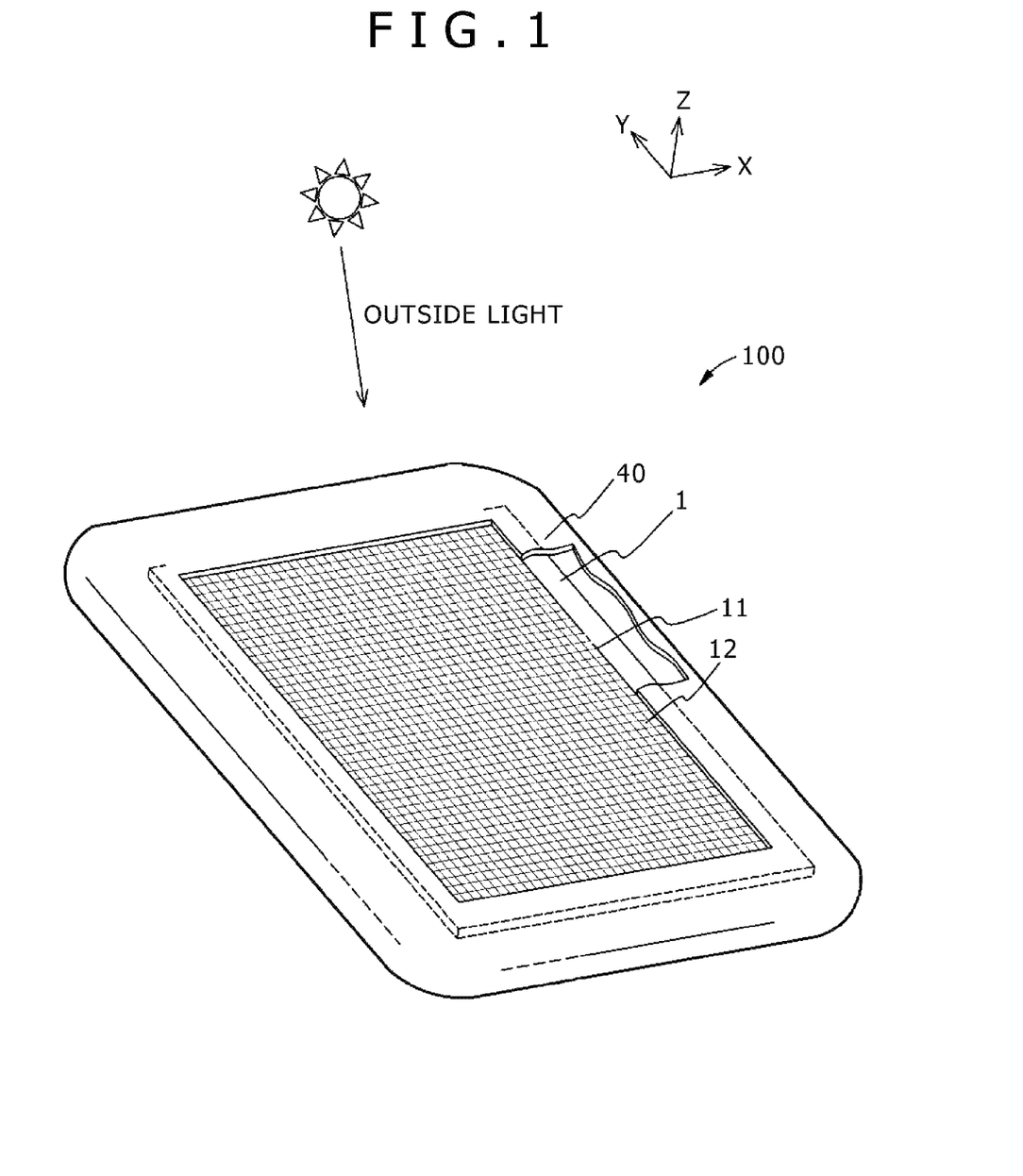
FIG. 1 is a schematic perspective view showing a display device according to a first embodiment of the present disclosure.

FIG. 1 is a schematic perspective view showing a display device according to a first embodiment of the present disclosure.

As shown in FIG. 1, a display device 100 includes a reflection type image display portion 1 having a display area 11 in which pixels 12 are disposed. The image display portion 1 includes a reflection type liquid crystal display panel and is incorporated in a chassis 40. The image display portion 1 is driven by a driving circuit (not shown) and the like. It is noted that in FIG. 1, the display device 100 is shown in a state in which part of the chassis 40 is broken away. An outside light such as a solar light is made incident to the display area 11. For the convenience of the description, it is supposed that the display area 11 is parallel with an X-Y plane, and an image observation side is in a +Z direction.

FIG. 2A is a schematic perspective view explaining a construction of the reflection type image display portion. FIG. 2B is a schematic cross sectional view explaining a structure of an anisotropic scattering member according to the first embodiment. FIGS. 2C and 2D are schematic perspective views each explaining a disposition of a low-refractive index area and a high-refractive index area in the anisotropic scattering member.

The image display portion 1 shown in FIG. 2A is a reflection type image display portion including a sheet-like anisotropic scattering member 20. More specifically, the image display portion 1 has a reflection type liquid crystal display panel including a front substrate, a back substrate, and a liquid crystal material layer disposed between the front substrate and the back substrate. Reference numeral 10 shown in FIG. 2A designates a portion of the liquid crystal display panel including a front substrate 18, a back substrate 14, and a liquid crystal material layer 17 disposed between the front substrate 18 and the back substrate 14 which are all shown in FIG. 6A which will be described later. The anisotropic scattering member 20 is disposed on the front substrate 18 side. Reference numeral 30 shown in FIG. 2A designates a portion of the liquid crystal display panel including a quarter-wave plate 31, a half-wave plate 32, and a polarizing plate 33 which are all shown in FIG. 6A.

As shown in FIG. 2A, the image display portion 1 has a rectangular shape, and four sides thereof are designated by reference symbols 13A, 13B, 13C, and 13D, respectively. The side 13C is a side on the near side, and the side 13A is a side facing the side 13C. For example, the length of each of the sides 13A and 13C is about 12 cm, and the length of each of the sides 13B and 13D is about 16 cm. These values are merely exemplified.

The anisotropic scattering member 20, for example, has a sheet-like (film-like) shape having a thickness of about 0.02 to 0.5 mm. In an area, in an in-plane direction, of the anisotropic scattering member 20, a low-refractive index area 21 and a high-refractive index area 22, for example, are disposed in a mixture style on the micron order. It is noted that, for convenience of an illustration in FIGS. 2A to 2D and the like, an illustration of a transparent film or the like becoming a base of the anisotropic scattering member 20 is omitted here.

Figure 6A:
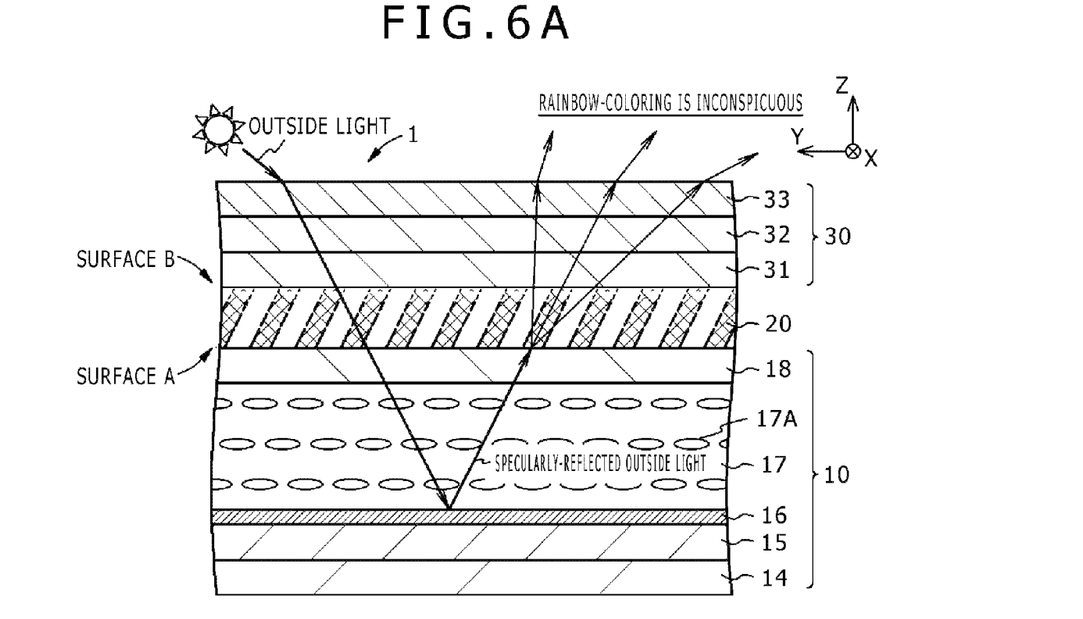
FIGS. 6A and 6B are respectively a schematic cross sectional view of the reflection type image display portion according to the first embodiment, and a schematic cross sectional view of a reflection type image display portion according to a reference example.

Although a detailed description will be given later with reference to FIG. 6A and the like which will be described later, the anisotropic scattering member 20 is disposed in such a way that the light is scattered when the outside light is made incident from the surface side on which the degree of the change in the refractive index in the vicinity of the boundary between the low-refractive index area 21 and the high-refractive index area 22 is relatively large, and is emitted from the surface side on which the degree of the change in the refractive index in the vicinity of the boundary between the low-refractive index area 21 and the high-refractive index area 22 is relatively small. In the first embodiment of the present disclosure, the anisotropic scattering member 20 is disposed in such a way that the light is scattered when the outside light reflected within the image display portion 1 is transmitted through the anisotropic scattering member 20.

The anisotropic scattering member 20 includes a composition containing therein a photoreactive compound. The anisotropic scattering member 20, for example, as shown in FIG. 2C, may have the low-refractive index area 21 and the high-refractive index area 22 formed in a louver-like shape. Or, as shown in FIG. 2D, the anisotropic scattering member 20 may have the low-refractive index area 21 and the high-refractive index area 22 forming a columnar area and a peripheral area surrounding the columnar area. In the case of FIG. 2D, for example, there is shown a case where a portion of the photoreacted composition exhibits the increased refractive index in the columnar area shape.

Although in FIG. 2C, a width, in a thickness direction, of each of low-refractive index areas 21 and a width, in the thickness direction, of each of high-refractive index areas 22 are represented so as to be constant, this is merely exemplified. Likewise, although in FIG. 2D as well, the shapes of columnar areas are represented so as to be identical to one another, this is also merely exemplified.

As shown in FIGS. 2B to 2D, the low-refractive index area 21 and the high-refractive index area 22 are formed obliquely inside the anisotropic scattering member 20 in such a way that the boundary between the low-refractive index area 21 and the high-refractive index area 22 makes an angle θ with the thickness direction of the anisotropic scattering member 20 (the Z-axis direction). The angle θ is suitably set to a preferable value in accordance with the specification and the like of the anisotropic scattering member 20. The angle θ may be zero as the case may be.

Figure 4A:
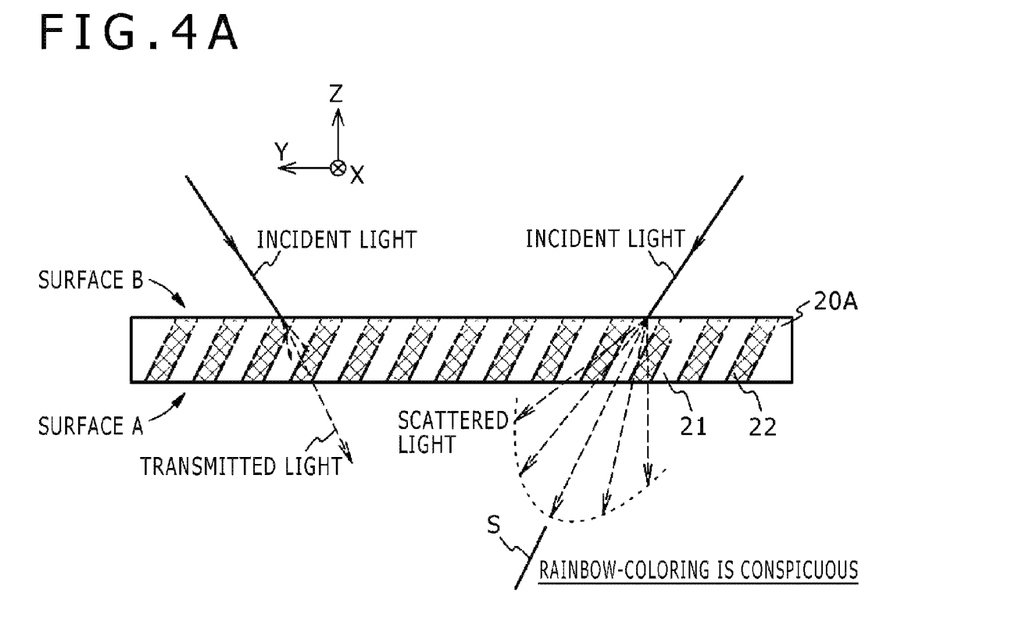
FIGS. 4A and 4B are schematic views each explaining a relationship between an incident light and a scattered light in the anisotropic scattering member.
Figure 4B:
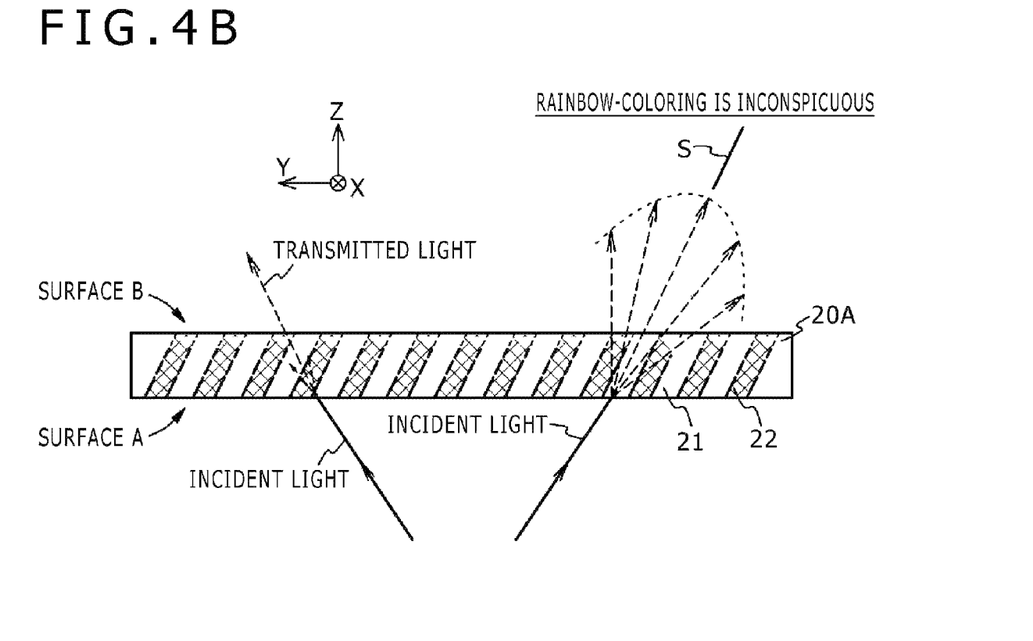

As shown in FIGS. 4A and 4B which will be described later, a scattering central axis S of the anisotropic scattering member 20 (The scattering central axis S is an axis with respect to which the anisotropic scattering characteristics of the incident light become approximately symmetry. In a word, it is an axis extending in an incidence direction of a most scattered light) is inclined obliquely with respect to a normal line direction (the Z-axis direction) to an observation surface of the display device 100. Qualitatively, however, the direction of the scattering central axis S is thought to be aligned with a direction approximately following an extension direction of the low-refractive index area 21 and the high-refractive index area 22. In addition, in this case, an azimuth direction obtained by projecting the scattering central axis S on the X-Y plane, in the case shown in FIG. 2C, is thought to be aligned with a direction perpendicular to an extension direction of the louver-like areas. In the case shown in FIG. 2D, the azimuth direction obtained by projecting the scattering central axis S on the X-Y plane is thought to be aligned with a direction in which a shadow extends when the columnar area is projected on the X-Y plane.

For the convenience of the description, in this case, it is supposed that the low-refractive index areas 21 and the high-refractive index areas 22, as shown in FIG. 2C, are formed in the louver-like shape, and that the direction in which these louver-like areas extend is in parallel with the X-axis direction. Although the high-refractive index area 22 is described as the area in which the base material causes the photoreaction, this is merely exemplified. Alternatively, the area in which the base material causes the photoreaction may be the low-refractive index area 21.

Figure 3A:
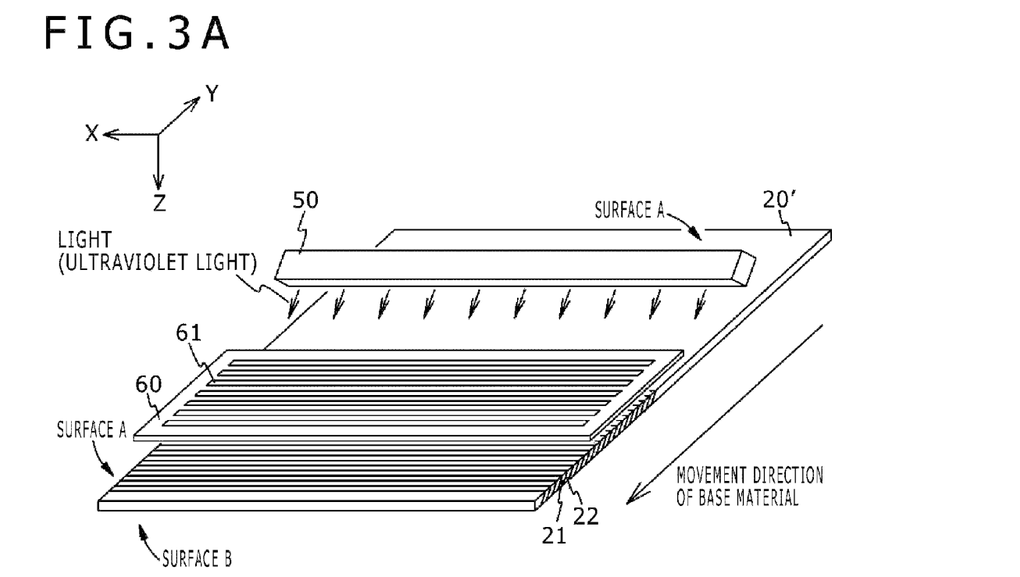
FIGS. 3A and 3B are schematic views explaining a method of manufacturing the anisotropic scattering member according to the first embodiment.
Figure 3B:
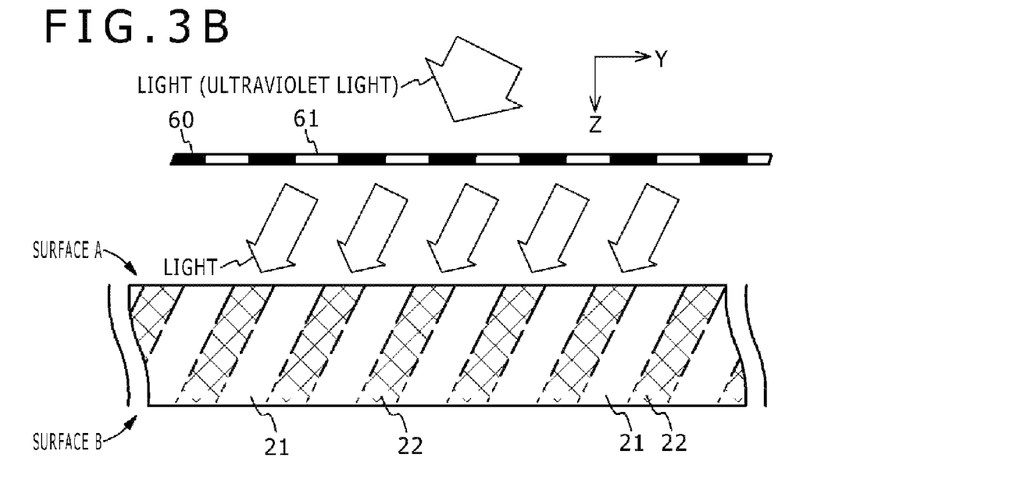

A method of manufacturing the anisotropic scattering member 20 will now be described with reference to FIGS. 3A and 3B. As shown in FIG. 3A, for example, a light is obliquely radiated from a light radiating device 50 to a base material 20' obtained by applying a photoreactive composition onto a base such as a PET film through a mask 60 having openings 61 formed therein, thereby making it possible to manufacture the anisotropic scattering member 20. It is noted that the light may be radiated with the mask 60 being omitted as the case may be. Of surfaces of the base materials 20', a surface on a side to which the light is radiated from the light radiating device 50 is represented as a surface A, and a surface opposite to the surface A is represented as a surface B.

Qualitatively, the photoreaction of the composition proceeds in an area closer to the light radiating side due to the influence of the diffraction of the light, the light absorption by the composition or the like. Therefore, as shown in FIG. 3B, the surface A to which the light is radiated becomes a surface in which the degree of the change in the refractive index in the vicinity of the boundary between the low-refractive index area 21 and the high-refractive index area 22 is relatively large. The surface B on the opposite side becomes a surface in which the degree of the change in the refractive index in the vicinity of the boundary between the low-refractive index area 21 and the high-refractive index area 22 is relatively small.

Here, a difference between the case where the outside light is made incident from the surface A side of the anisotropic scattering member 20, and the case where the outside light is made incident from the surface B side of the anisotropic scattering member 20 will be described with reference to FIGS. 4A and 4B.

As shown in FIGS. 4A and 4B, in the anisotropic scattering member 20, when the light is made incident from the direction approximately following the direction in which the boundary between the low-refractive index area 21 and the high-refractive index area 22 extends, the light is scattered to be emitted. When the light is made incident from the direction approximately perpendicular to the direction in which the boundary between the low-refractive index area 21 and the high-refractive index area 22 extends, the light is transmitted as it is.

As shown in FIG. 4A, in the case where the light is scattered when the light is made incident from the surface B side to be emitted from the surface A side, the scattered lights are emitted from the surface in which the degree of the change in the refractive index in the vicinity of the boundary between the low-refractive index area 21 and the high-refractive index area 22 is relatively large. As a result, rainbow-coloring due to the interference of the lights owing to the fine structure of the anisotropic scattering member 20 is conspicuous.

As shown in FIG. 4B, in a case where the light is scattered when the light is made incident from the surface A side to be emitted from the surface B side, the scattered lights are emitted from the surface in which the degree of the change in the refractive index in the vicinity of the boundary between the low-refractive index area 21 and the high-refractive index area 22 is relatively small. As a result, the rainbow-coloring due to the interference of the lights owing to the fine structure of the anisotropic scattering member 20 is reduced.

Figure 5:
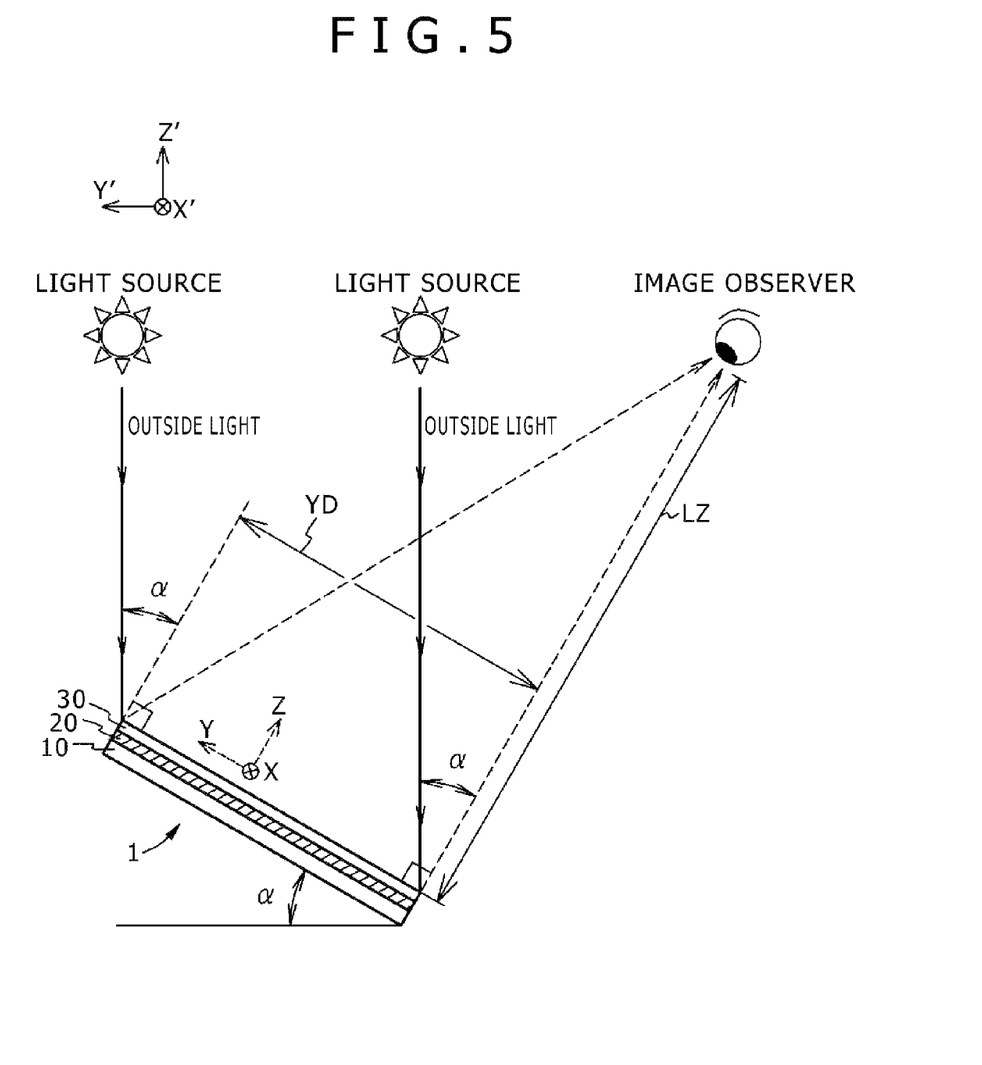
FIG. 5 is a schematic view explaining a positional relationship between the display device and an image observer when outside lights which are approximately parallel with one another are made incident.

FIG. 5 is a schematic view explaining a positional relationship between the display device and an image observer when outside lights approximately parallel with one another are made incident. Specifically, FIG. 5 shows a state when the image observer observes an image in a place which is located at a distance LZ from the display area 11 in a state in which the incidence direction of the outside lights and the normal line direction to the image display portion 1 are caused to make an angle a with each other.

A behavior of the light in the image display portion 1 at this time will be described with reference to FIG. 6A.

A planarizing film 15 made of a high-molecular material such as acrylic resin is formed on the back substrate 14, for example, made of a glass material. A reflective electrode (pixel electrode) 16 made of a metallic material such as aluminum is formed on the planarizing film 15. The reflective electrode 16 is formed in a mirror-like shape in a surface thereof, and is provided so as to correspond to each of the pixels 12. For the purpose of controlling the electrical connection between a signal line and the reflective electrode 16, elements such as Thin Film Transistors (TFTs) are connected so as to correspond to the pixels 12, respectively. It is noted that in FIGS. 3A and 3B, an illustration of the TFTs and various kinds of wirings such as the signal line is omitted for the sake of simplicity.

A common electrode (not shown) made of a transparent conductive material such as Indium Tin Oxide (ITO) is provided on the front substrate 18, for example, made of a glass material. In the case of the color display, the pixel 12 includes a pair of sub-pixels. A color filter and the like are provided so as to correspond to the sub-pixels, respectively. It is noted that for convenience of the illustration, in FIGS. 6A and 6B, and the like, an illustration of the common electrode and the like is omitted.

The liquid crystal material layer 17 is disposed between the front substrate 18 and the back substrate 14. Reference symbol 17A schematically designates a liquid crystal molecule composing the liquid crystal material layer 17. The liquid crystal material layer 17 is installed in such a thickness that, when the light travels back and forth through the liquid crystal material layer 17, the liquid crystal material layer 17 operates as a half-wave plate under a predetermined condition through a spacer (not shown) or the like.

The anisotropic scattering member 20 is disposed on the surface on the side opposite to the liquid crystal material layer 17 side of the front substrate 18. The quarter-wave plate 31, the half-wave plate 32, and the polarizing plate 33 are disposed on the anisotropic scattering member 20 in this order.

After the outside light made incident from the outside has become a linearly polarized light in a predetermined direction through the polarizing plate 33, the outside light is then transmitted through both of the half-wave plate 32 and the quarter-wave plate 31 to become a circularly polarized light. A combination of the half-wave plate 32 and the quarter-wave plate 31 operates as a broad-band quarter-wave plate. The outside light which has become the circularly polarized light is made incident from the direction approximately perpendicular to the direction in which the boundary between the low-refractive index area 21 and the high-refractive index area 22 extends. Thus, after the outside light has been transmitted through the anisotropic scattering member 20 as it is, the outside light is transmitted through the liquid crystal material layer 17 and is then reflected by the reflective electrode 16. The outside light thus reflected is transmitted through the liquid crystal material layer 17 and is then made incident from the surface A side of the anisotropic scattering member 20 to be emitted from the surface B side. The light is scattered because the light is made incident from the direction approximately following the direction in which the boundary between the low-refractive index area 21 and the high-refractive index area 22 extends. However, since the light is emitted from the surface in which the degree of the change in the refractive index in the vicinity of the boundary between the low-refractive index area 21 and the high-refractive index area 22 is relatively small, the rainbow-coloring due to the interference of the lights owing to the fine structure of the anisotropic scattering member 20 is reduced. After that, the light thus scattered is transmitted through both of the quarter-wave plate 31 and the half-wave plate 32 to reach the polarizing plate 33, and is then emitted toward the outside. An orientational state of liquid crystal molecules 17A in the liquid crystal material layer 17 is controlled by controlling a voltage to be applied to the reflective electrode 16 or the like, whereby it is possible to control an amount of outside light which is reflected by the reflective electrode 16 and is then transmitted through the polarizing plate 33.

A description will now be given with respect to a behavior of the light when the surface A side and the surface B side of the anisotropic scattering member 20 are replaced with each other. The behavior of the light in an image display portion 1' in a reference example in which the surface A side and the surface B side of the anisotropic scattering member 20 are replaced with each other will now be described with reference to FIG. 6B.

Figure 6B:
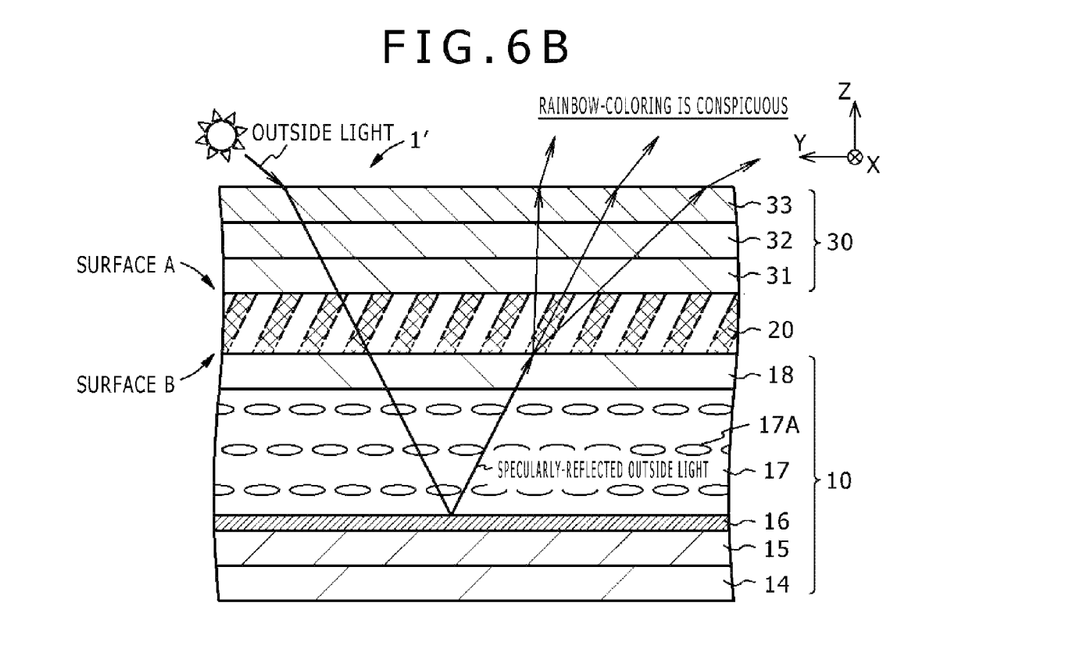

In this case, the behavior until the outside light reflected by the reflective electrode 16 is transmitted through the liquid crystal material layer 17 is the same as that described above. The reflected outside light is transmitted through the liquid crystal material layer 17 and is then made incident from the surface B side of the anisotropic scattering member 20 to be emitted from the surface A side. The light is scattered because the light is made incident from the direction approximately following the direction in which the boundary between the low-refractive index area 21 and the high-refractive index area 22 extends. Since the light is emitted from the surface in which the degree of the change in the refractive index in the vicinity of the boundary between the low-refractive index area 21 and the high-refractive index area 22 is relatively large, the rainbow-coloring due to the interference of the lights owing to the fine structure of the anisotropic scattering member 20 is conspicuous.

In such a manner, in the first embodiment of the present disclosure, the anisotropic scattering member is disposed in such a way that the light is scattered when the outside light is made incident from the surface side on which the degree of the change in the refractive index in the vicinity of the boundary between the low-refractive index area and the high-refractive index area is relatively large, and is emitted from the surface side on which the degree of the change in the refractive index in the vicinity of the boundary between the low-refractive index area and the high-refractive index area is relatively small. More specifically, the anisotropic scattering member is disposed in such a way that the light is scattered when the outside light reflected within the image display portion is transmitted through the anisotropic scattering member to travel toward the outside. The light is scattered when the light is emitted from the surface in which the degree of the change in the refractive index in the vicinity of the boundary between the low-refractive index area and the high-refractive index area is relatively small. As a result, rainbow-coloring due to the interference of the lights owing to the fine structure of the anisotropic scattering member is reduced.

3. Second Embodiment

A second embodiment also relates to the display device according to the present disclosure.

The second embodiment is different from the first embodiment in that the anisotropic scattering member is disposed in such a way that the light is scattered when the outside light made incident from the outside is transmitted through the anisotropic scattering member.

A display device 200 of the second embodiment has the same structure as that of the display device 100 of the first embodiment except that the disposition of the anisotropic scattering member in the second embodiment is different from that of the anisotropic scattering member in the first embodiment. A schematic perspective view of the display device 200 of the second embodiment is omitted here because it is only necessary that the image display portion 1 shown in FIG. 1 is replaced with an image display portion 2, and the display device 100 is replaced with the display device 200. A schematic perspective view explaining a structure of the image display portion 2 used in the second embodiment is omitted here because it is only necessary that the disposition of the anisotropic scattering member 20 shown in FIG. 2A is replaced with another one by carrying out suitable change, and the image display portion 1 is replaced with the image display portion 2.

In the second embodiment as well, the anisotropic scattering member 20 is disposed in such a way that the light is scattered when the outside light is made incident from the surface side on which the degree of the change in the refractive index in the vicinity of the boundary between the low-refractive index area 21 and the high-refractive index area 22 is relatively large, and is emitted from the surface side on which the degree of the change in the refractive index in the vicinity of the boundary between the low-refractive index area 21 and the high-refractive index area 22 is relatively small. In the second embodiment of the present disclosure, the anisotropic scattering member 20 is disposed in such a way that the light is scattered when the outside light made incident from the outside is transmitted through the anisotropic scattering member 20.

A behavior of the light in the image display portion 2 in a state in which the incidence direction of the outside light and the normal line direction to the image display portion 2 are caused to make an angle a with each other similarly to the description given in the first embodiment will now be described with reference to FIG. 7A.

Figure 7A:
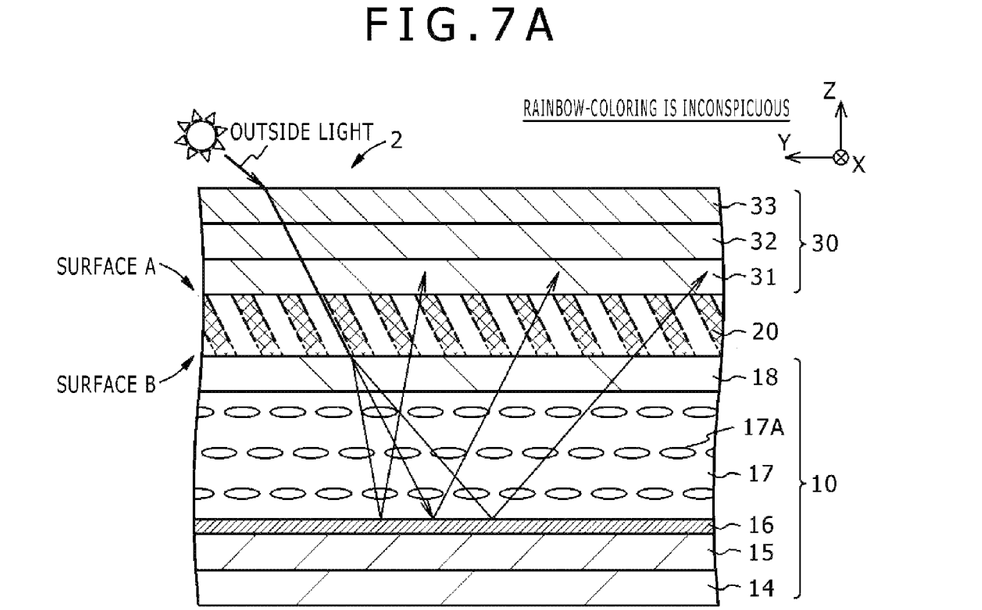
FIGS. 7A and 7B are respectively a schematic cross sectional view of a reflection type image display portion according to a second embodiment of the present disclosure, and a schematic cross sectional view of a reflection type image display portion according to a reference example.

As shown in FIG. 7A, after the outside light made incident from the outside has been transmitted through the polarizing plate 33, the half-wave plate 32, and the quarter-wave plate 31, the outside light is made incident to the anisotropic scattering member 20. Unlike the first embodiment, the anisotropic scattering member 20 is disposed in such a way that the direction in which the boundary between the low-refractive index area 21 and the high-refractive index area 22 extends approximately follows the direction of the incident light. The outside light is scattered when the outside light is made incident from the surface A side and is then emitted from the surface B side. The light is scattered when the light is emitted from the surface in which the degree of the change in the refractive index in the vicinity of the boundary between the low-refractive index area 21 and the high-refractive index area 22 is relatively small. As a result, the rainbow-coloring due to the interference of the lights owing to the fine structure of the anisotropic scattering member 20 is reduced. The light thus scattered is transmitted through the liquid crystal material layer 17 and is then reflected by the reflective electrode 16 to be transmitted through the liquid crystal material layer 17. Then, the light is made incident from the surface B side of the anisotropic scattering member 20 to be emitted from the surface A side of the anisotropic scattering member 20. The light is made incident from the direction approximately perpendicular to the direction in which the boundary between the low-refractive index area 21 and the high-refractive index area 22 extends. Therefore, the light is transmitted through the anisotropic scattering member 20 as it is, and is then transmitted through both of the quarter-wave plate 31 and the half-wave plate 32 to reach the polarizing plate 33, and is then emitted toward the outside.

A description will now be given with respect to a behavior of the light when the surface A side and the surface B side of the anisotropic scattering member 20 are replaced with each other. The behavior of the light in an image display portion 2' of a reference example in which the surface A side and the surface B side of the anisotropic scattering member 20 are replaced with each other will now be described with reference to FIG. 7B.

Figure 7B:
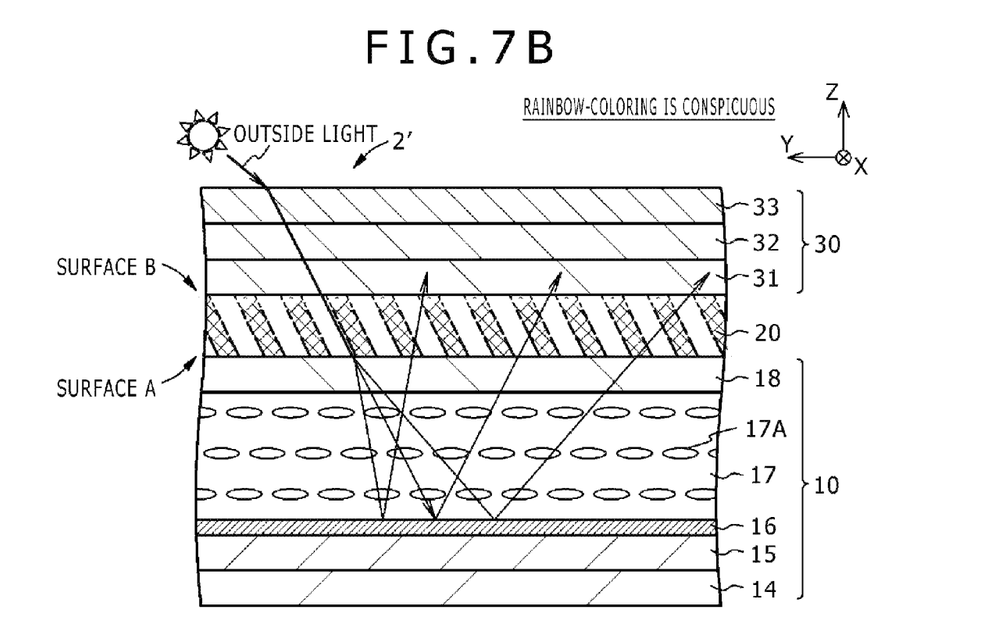

In this case, the outside light made incident from the outside is scattered when the outside light is emitted from the surface in which the degree of the change in the refractive index in the vicinity of the boundary between the low-refractive index area 21 and the high-refractive index area 22 is relatively large. Therefore, the rainbow-coloring due to the interference of the lights owing to the fine structure of the anisotropic scattering member 20 is conspicuous. The behavior until the scattered light is reflected by the reflective electrode 16 to travel toward the outside is the same as that described above.

As described above, in the second embodiment, the anisotropic scattering member is disposed in such a way that the light is scattered when the outside light made incident from the outside is transmitted through the anisotropic scattering member. The light is scattered when the light is emitted from the surface in which the degree of the change in the refractive index in the vicinity of the boundary between the low-refractive index area and the high-refractive index area is relatively small. As a result, the rainbow-coloring due to the interference of the lights owing to the fine structure the anisotropic scattering member is reduced.

4. Third Embodiment

A third embodiment also relates to the display device according to the present disclosure.

The third embodiment is different from the first embodiment in that the anisotropic scattering member includes plural scattering members, different in scattering characteristics from one another, laminated one upon another.

A display device 300 according to the third embodiment of the present disclosure has the same structure as that of the display device 100 according to the first embodiment of the present disclosure except that the structure of the anisotropic scattering member in the third embodiment is different from that of the anisotropic scattering member in the first embodiment. A schematic perspective view of the display device 300 of the third embodiment is omitted here because it is only necessary that the image display portion 1 shown in FIG. 1 is replaced with an image display portion 3, and the display device 100 is replaced with the display device 300. A schematic perspective view explaining a structure of the image display portion 3 used in the third embodiment is omitted here because it is only necessary that the anisotropic scattering member 20 shown in FIG. 2A is replaced with another one by carrying out suitable change, and the image display portion 1 is replaced with the image display portion 3.

Figure 8:
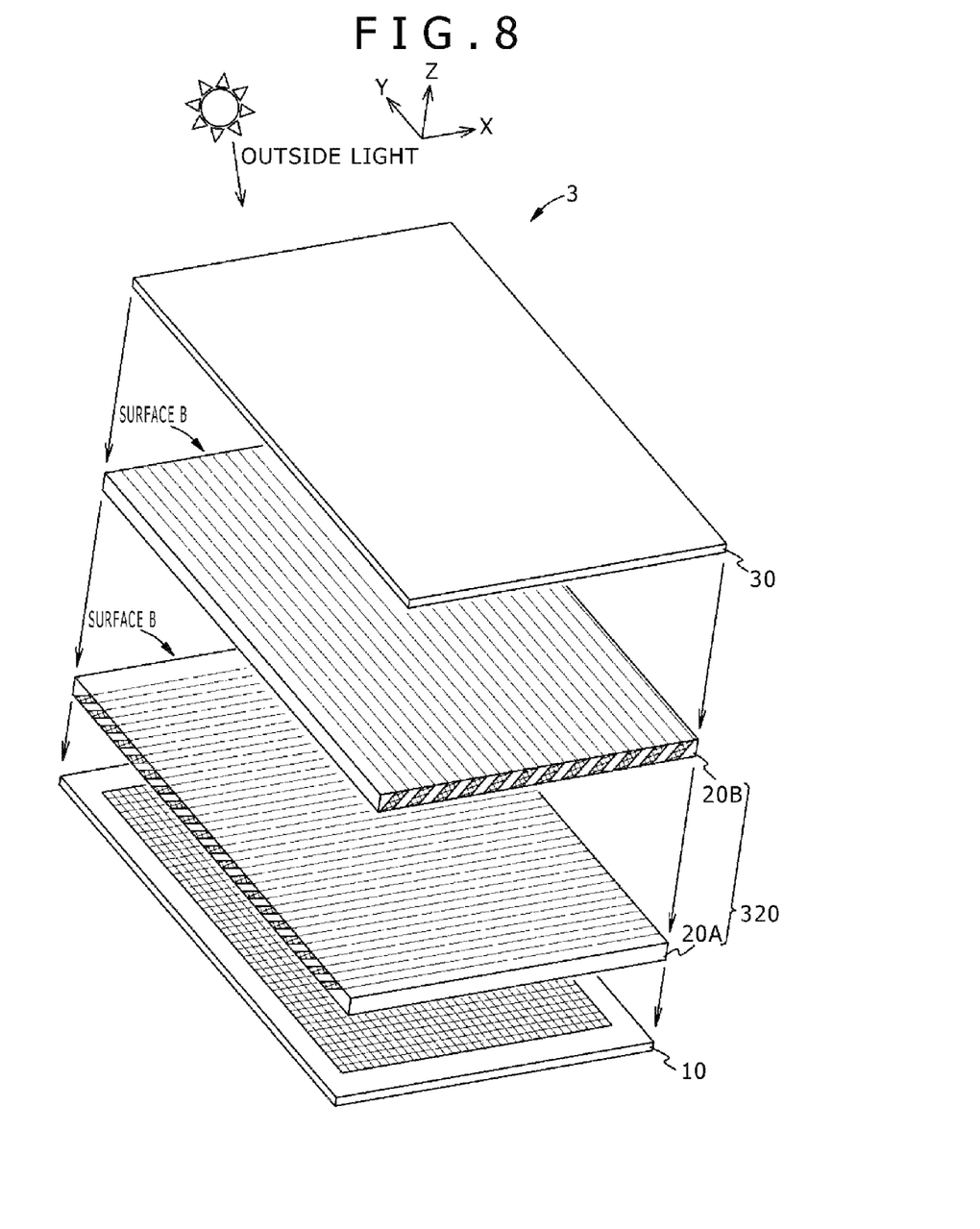
FIG. 8 is a schematically exploded perspective view showing a reflection type image display portion according to a third embodiment of the present disclosure.

FIG. 8 is a schematic exploded perspective view showing the reflection type image display portion according to the third embodiment.

As shown in FIG. 8, in the image display portion 3, a scattering member 20A and a scattering member 20B are laminated on top of each other. A structure and a disposition of the scattering member 20A are the same as those of the anisotropic scattering member 20 previously described in the first embodiment.

A structure of the scattering member 20B is also the same as that of the anisotropic scattering member 20 previously described in the first embodiment. However, in the image display portion 3, the scattering member 20B is disposed in such a way that a direction in which its louver-like structure is inclined is perpendicular to a direction in which the louver-like structure is inclined in the scattering member 20A.

A direction of the scattering central axis S of the scattering member 20A is different from that of the scattering member 20B. Also, a shape of an area in which the light diffuses of the scattering member 20A is different from that of the scattering member 20B. Therefore, plural scattering members different in the scattering characteristics from one another are laminated one upon another, thereby structuring an anisotropic scattering member 320.

In such a way, the plural scattering members different in the scattering characteristics from one another are laminated one upon another, thereby making it possible to adjust a diffusion range of the light.

For example, if in the scattering member 20A, the area in which the light diffuses has an elliptical shape with a Y-axis as a long axis, in the scattering member 20B, the area in which the light diffuses becomes an elliptical shape with an X-axis as a long axis. Therefore, when the scattering members 20A and 20B are laminated on top of each other, the area in which the light diffuses becomes approximately a square and round shape. Therefore, even if a line of sight moves in some degree of width in the vertical and horizontal directions, it is possible to observe an excellent image.

5. Fourth Embodiment

A fourth embodiment also relates to the display device according to the present disclosure.

The fourth embodiment is also different from the first embodiment in that the anisotropic scattering member includes plural scattering members, different in scattering characteristics from one another, laminated one upon another.

The display device 400 according to the fourth embodiment of the present disclosure has the same structure as that of the display device 100 according to the first embodiment of the present disclosure except that the structure of the anisotropic scattering member in the fourth embodiment is different from that of the anisotropic scattering member in the first embodiment. A schematic perspective view of the display device 400 of the fourth embodiment is omitted here because it is only necessary that the image display portion 1 shown in FIG. 1 is replaced with an image display portion 4, and the display device 100 is replaced with the display device 400. A schematic perspective view explaining a structure of the image display portion 4 used in the fourth embodiment is omitted here because it is only necessary that the anisotropic scattering member 20 shown in FIG. 2A is replaced with another one by carrying out suitable change, and the image display portion 1 is replaced with the image display portion 4.

Figure 9:
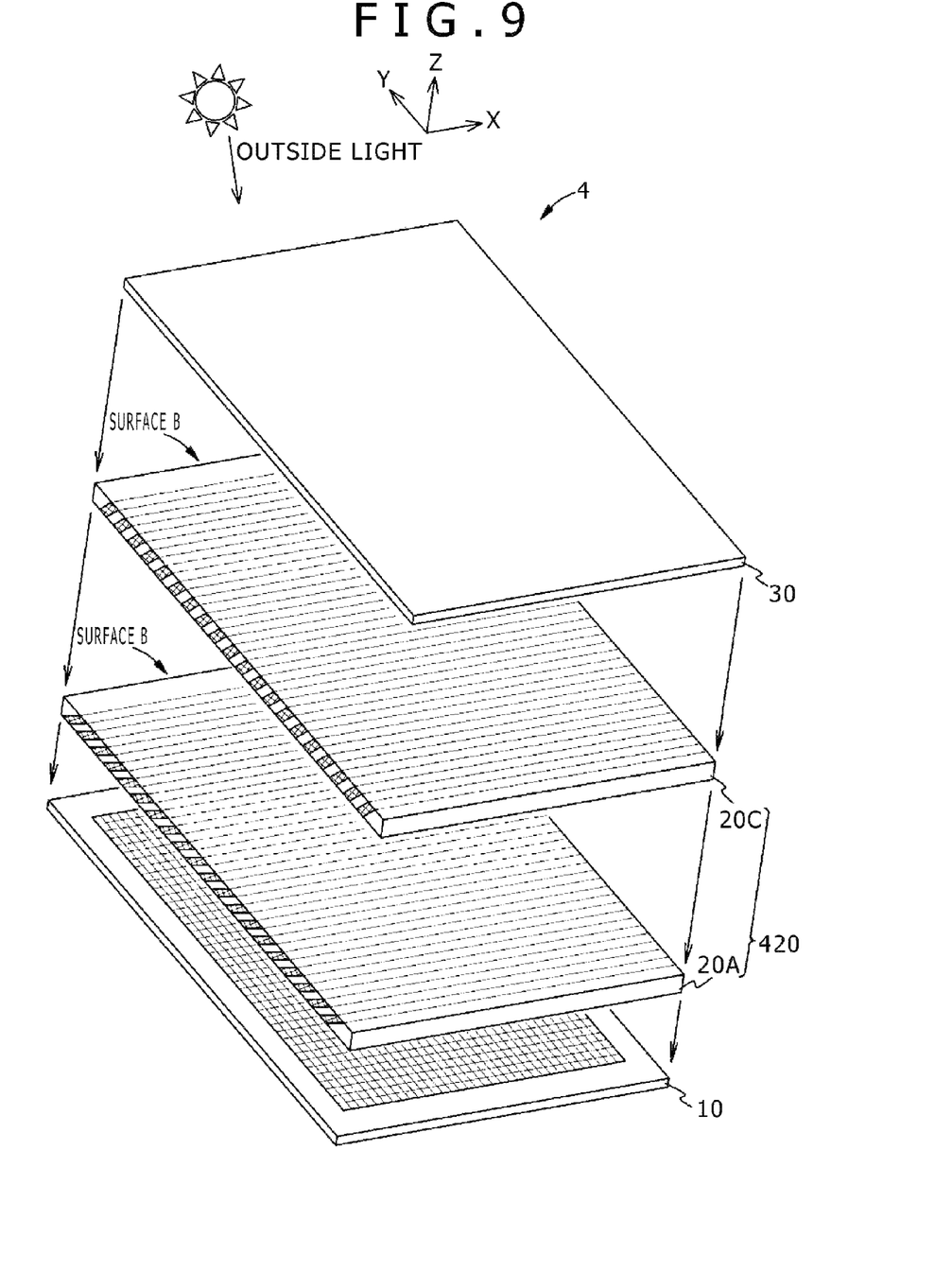
FIG. 9 is a schematically exploded perspective view showing a reflection type image display portion according to a fourth embodiment of the present disclosure.

FIG. 9 is a schematic exploded perspective view showing the reflection type image display portion according to the fourth embodiment.

As shown in FIG. 9, in the image display portion 4, the scattering member 20A and a scattering member 20C are laminated on top of each other. The structure and disposition of the scattering member 20A are the same as those of the anisotropic scattering member 20 previously described in the first embodiment.

The scattering member 20C has the same structure as that of the anisotropic scattering member 20 previously described in the first embodiment except that the value of the angle θ shown in FIG. 2B is different. In the image display portion 4, the disposition is carried out in such a way that a direction in which the louver-like structure is inclined in the scattering member 20C follows the direction in which the louver-like structure is inclined in the scattering member 20A.

Figure 10:
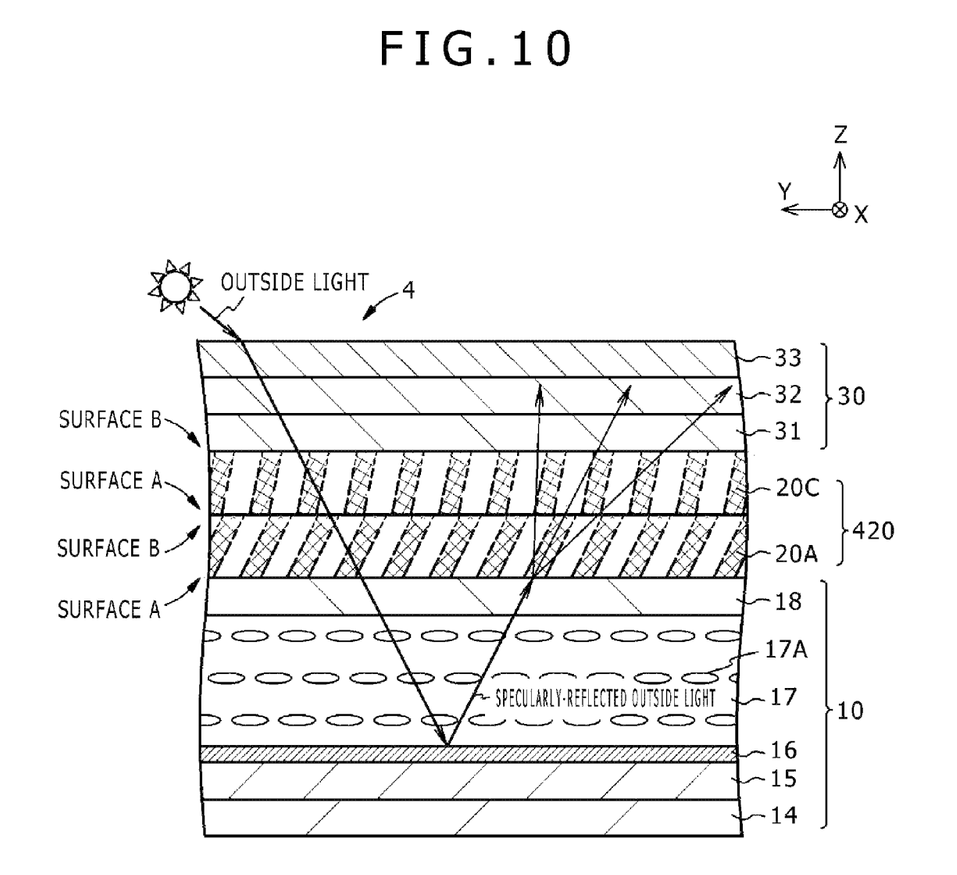
FIG. 10 is a schematic cross sectional view showing the reflection type image display portion according to the fourth embodiment of the present disclosure.

FIG. 10 is a schematic cross sectional view showing the reflection type image display portion according to the fourth embodiment of the present disclosure.

A direction of the scattering central axis S of the scattering member 20A is different from that of the scattering member 20C. Also, the shape of the area in which the light diffuses of the scattering member 20A is different from that of the scattering member 20C. Therefore, plural scattering members different in the scattering characteristics from one another are laminated one upon another, thereby structuring an anisotropic scattering member 420. In such a way, the plural scattering members different in the scattering characteristics from one another are laminated one upon another, thereby making it possible to adjust the diffusion range of the light.

Although the present disclosure has been concretely described so far based on the embodiments, the present disclosure is by no means limited to the embodiments described above, and various kinds of changes thereof based on the technical idea of the present disclosure can be made.

For example, although in each of the first to fourth embodiments, the anisotropic scattering member is disposed between the front substrate 18 and the quarter-wave plate 31, this structure is merely exemplified. It is only necessary that the place where the anisotropic scattering member is disposed is suitably determined in accordance with the design and specification of the display device.

It is noted that the present disclosure can also adopt following configurations.

(1) A display device including:
  a reflection type image display portion having a sheet-like anisotropic scattering member,
  in which in an area, in an in-plane direction, of the anisotropic scattering member, a low-refractive index area and a high-refractive index area are disposed in a mixture style, and
  the anisotropic scattering member is disposed so that a light is scattered when an outside light is made incident from a surface side on which a degree of a change in a refractive index in a vicinity of a boundary between the low-refractive index area and the high-refractive index area is relatively large, and is emitted from a surface side on which the degree of the change in the refractive index in the vicinity of the boundary between the low-refractive index area and the high-refractive index area is relatively small.

(2) The display device described in the paragraph (1),
  in which the anisotropic scattering member is disposed in such a way that the light is scattered when the outside light reflected within the image display portion is transmitted through the anisotropic scattering member.

(3) The display device described in the paragraph (1),
  in which the anisotropic scattering member is disposed in such a way that the light is scattered when the outside light made incident from an outside is transmitted through the anisotropic scattering member.

(4) The display device described in any one of the paragraphs (1) to (3),
in which the image display portion has a reflection type liquid crystal display panel including a front substrate, a back substrate, and a liquid crystal material layer disposed between the front substrate and the back substrate, and
the anisotropic scattering member is disposed on the front substrate side.

(5) The display device described in any one of the paragraphs (1) to (4),
in which the anisotropic scattering member includes plural scattering members, different in scattering characteristics from one another, laminated one upon another.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a reflection type image display portion including a sheet-like anisotropic scattering member,
wherein in an area, in an in-plane direction of the anisotropic scattering member, a low-refractive index area and a high-refractive index area are disposed in a mixture style,
wherein the anisotropic scattering member includes a first scattering layer and a second scattering layer, and
wherein a first direction in which a high-refractive index area of the first scattering layer extends intersects with a second direction in which a high-refractive index area of the second scattering layer extends.

2. The display device according to claim 1,
wherein the high-refractive index area has a louver-like shape or a columnar shape.

3. The display device according to claim 1,
wherein the image display portion has a rectangular shape,
wherein the first direction is along a short side of the image display portion, and
wherein the second direction is along a long side of the image display portion.

4. The display device according to claim 1,
wherein each of the first scattering layer and the second scattering layer includes a first surface and a second surface, the first surface having a relatively large degree of change in a refractive index in a vicinity of a boundary between the low-refractive index area and the high-refractive index area, and the second surface having a relatively small degree of change in the refractive index in the vicinity of the boundary between the low-refractive index area and the high-refractive index area.

5. The display device according to claim 1,
wherein the anisotropic scattering member is disposed such that light is scattered when outside light reflected within the display portion is transmitted through the anisotropic scattering member.

6. The display device according to claim 1,
wherein the anisotropic scattering member is disposed such that light is scattered when outside light made incident from an outside is transmitted through the anisotropic scattering member.

7. The display device according to claim 1,
wherein the image display portion includes a reflection type liquid crystal display panel including a front substrate, a back substrate, and a liquid crystal material layer disposed between the front substrate and the back substrate, and
wherein the anisotropic scattering member is disposed on the front substrate side.

8. The display device according to claim 1,
wherein the first scattering layer and the second scattering layer have different scattering characteristics from one another and are laminated one upon another.

* * * * *